Jan. 24, 1967  J. J. DIGBY  3,300,006

STARTER DRIVE

Filed Jan. 29, 1965

WITNESS:
Esther M. Stockton

INVENTOR.
James J. Digby
BY
W. S. Thompson
ATTORNEY

United States Patent Office 3,300,006
Patented Jan. 24, 1967

3,300,006
STARTER DRIVE
James J. Digby, Elmira, N.Y., assignor to The Bendix Corporation, Elmira, N.Y., a corporation of Delaware
Filed Jan. 29, 1965, Ser. No. 428,993
11 Claims. (Cl. 192—63)

This invention relates to a starter clutch for automatically controlling the engagement and disengagement of a starter driving means to an engine. More particularly, this invention relates to a starter clutch device having a spring retarder means for causing axial translation of the driving clutch member into engagement with a driven clutch member and to automatically hold the clutch members apart in a disengaged position after an engine start.

An object of this invention is to provide a simple, efficient and reliable mechanical means for engaging and disengaging a clutch mechanism.

Another object of this invention is to disengage the driven shaft from the driving clutch to prevent damage to the driving mechanism when the driven shaft overspeeds and to prevent the ensuing wear and damage to the clutch mechanism during overspeeding.

Another object of this invention is to insure positive engagement between the driving and the driven portion of the clutch mechanism during the period when it is desired to start an engine.

A further object of this invention is to provide for disengagement of the clutch members once a true engine start has occurred to prevent rotation of the driving shaft and the resultant damage to the starting motor.

A still further object of this invention is to prevent damage to the bearings of both the driven shaft and the drive shaft by the use of thrust abutments.

Additional objects and advantages will be readily apparent from the following detailed description taken in connection with the appended drawing showing an embodiment of the invention used in a starter mechanism in which.

Figures 1, 2, 3:
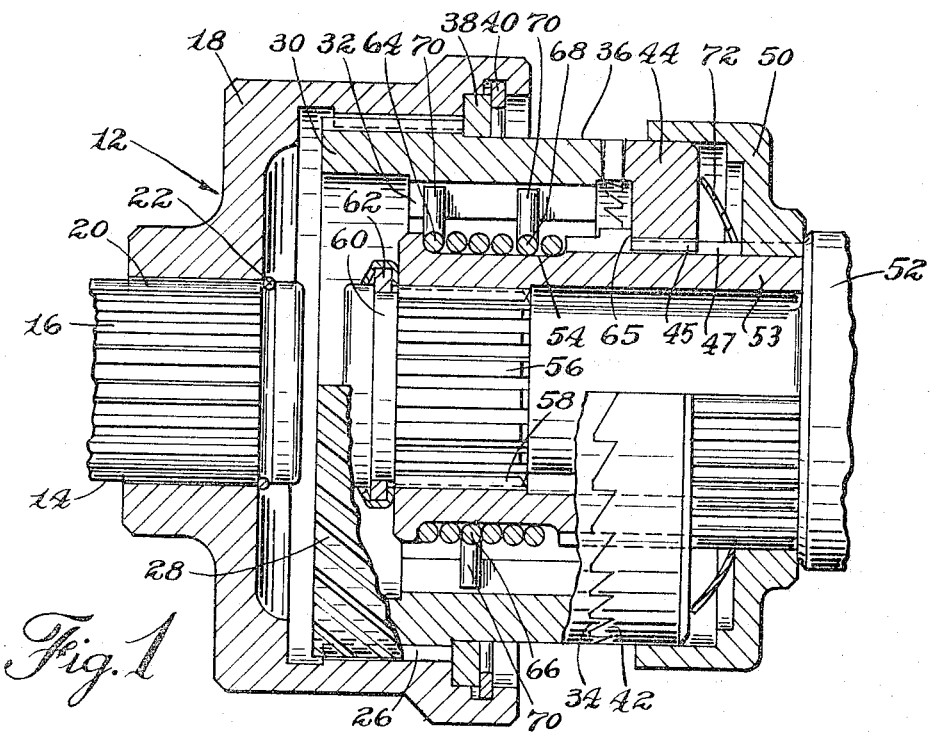
FIGURE 1 is an axial view, partly broken away and in section, showing a clutch mechanism secured to a starter motor shaft and to a driven shaft employing one embodiment of the invention.
FIGURE 2 is a view of a retarder spring being an embodiment of part of the invention.
FIGURE 3 is a side view of a retarder spring being an embodiment of part of the invention.

In FIGURE 1, there is illustrated a driving mechanism, generally indicated by the numeral 12 and a driving shaft 14 having splines 16. A driving case 18 has splines 20 formed on it which engage the splines 16 of the driving shaft 14. Those skilled in the art will appreciate that the driving case and driving shaft may be one unit or that they may be joined together by some means other than splines without departing from the spirit and scope of this invention.

The driving case is axially fixed to the driving shaft 14 by a split ring 22 fitted in a groove at the end of the driving shaft 14.

The driving case 18 has a helical spline 26 formed on its inner surface which engages the matching helical spline 28 of the driving clutch 30. The inner surface of the driving clutch 30 has slots 32 formed thereon. Although this embodiment of the invention shows the driving clutch 30 placed within the driving case 18, those skilled in the art will recognize that the driving case 18 could be mounted concentrically within the driving clutch 30 without departing from the scope of the invention.

The driving clutch 30 has clutch teeth or dentils 34 formed on one end and a slightly-reduced diameter 36 to engage an annular abutment stop 38 which is fixed to the driving clutch case 18 by a slot ring 40. The clutch teeth or dentils 34 of the driving clutch 30 are shown engaging the clutch teeth or dentils of the driven clutch 44. The driven clutch 44 has splines 45 formed on its inner surface which engage the splines 47 formed on the outer surface of the driven shaft sleeve adapter 53, thereby rotationally linking the driven clutch 44 and the driven shaft sleeve adapted 53. Sleeve adapter 53 is in turn fixedly connected to driven shaft 52 by splines 56 and 58 formed on the driven shaft 52 and the sleeve adapter 53 respectively to form an integral assembly with the driven shaft to provide driven shaft means which may be removably connected.

The driven case 50 is mounted concentrically on the driven shaft sleeve adapter 53. The sleeve adapter 53, extending within the driving clutch 30, has a recessed surface 54 radially inwardly of the driving clutch 30. A split ring 62 is attached to a groove 60 on the driven shaft 52 to hold the driven shaft 52 axially in place.

Three retarder springs 64, 66 and 68 are fitted to the reduced surface 54 of the sleeve adapter 53; each has a tang 70 which engages the slots 32 of the driving clutch 30.

In the present embodiment of this invention, three springs 64, 66 and 68 of one and one-half turns each are used as shown in FIGURE 3. Each spring has a tang 70 extending radially outwardly as shown in FIGURES 2 and 3.

In the present embodiment of the invention, the springs 64, 66 and 68 are so arranged that when driven clutch is rotating at a slower speed than the driving clutch, the springs grip the driven shaft by closing upon it more tightly. When, on the other hand, the driven clutch is rotating more rapidly than the driving clutch, the springs 64, 66 and 68 engage the driven shaft less tightly. Those skilled in the art can readily appreciate that the number of springs can be varied without departing from the scope of the present invention. Similarly, it should be obvious to those skilled in the art that the present invention will be operative if the driven shaft surface is smooth and is not recessed as shown in this specification.

An annular mesh enforcing spring 72 is fitted on the sleeve adapter 53 between the driven case 50 and the driven clutch 44. In the event of clutch tooth abutment, the mesh enforcing spring compresses, permitting the driving clutch 30 to rotate and index the driving clutch teeth 34 relative to the driven clutch teeth 42 until full engagement of the teeth is assured. An annular abutment stop 65 is fixed to the sleeve adapter 53 which contacts the driven clutch 44, limiting its axial movement, thereby eliminating axial thrust on the driving clutch 30, protecting the starter motor bearings.

Assuming the driven shaft 53 is at rest, when the driving shaft 14 is rotated, in turn rotating the driving clutch 30, the retarder springs 64, 66 and 68 wind more tightly on the sleeve adapter 53 and engage it. Because of the cooperation between the springs tangs 70 and the driving clutch slots 32, the retarder springs thereby frictionally resist the rotation of the driving clutch 30. As a result of such resistance, the driving clutch 30 moves axially on its splined connection to the driving case 18 in the direction of the driven clutch.

The clutch teeth 34 of the driving clutch 30 engage the clutch teeth 42 of the driven clutch 44, causing the driven clutch to rotate and, in turn, rotating the sleeve adapter 53 and driven shaft 52. The mesh enforcing spring 72 automatically forces the indexing and engagement of the clutch teeth as described earlier.

If, as in this embodiment of the invention, the driven shaft were attached to a motor such as a turbine engine or the like (not shown) to be rotated, when the motor attained a true start, the driven clutch 44 overspeeds the driving clutch 30. When this overspeed condition is reached, the driving clutch 30 rotation will be frictionally resisted by the retarder springs 64, 66 and 68 which urges the driving clutch to travel to the left in a clutch disengaged direction on the helical splines 26, 28. At overspeed, the frictional engagement between sleeve adapter 53 and retarder springs 64, 66 and 68 will be less than at the beginning of the cycle. Less frictional engagement is necessary at overspeed because the shape of the clutch teeth encourages disengagement at overspeed and because at overspeed the driven shaft 52 is turning much more rapidly than the driving shaft 14. The lessened functional engagement at overspeed is further desirable since it prevents the driven shaft 52 from causing the driving clutch 30 to rotate, thereby damaging the starter motor. Less frictional engagement also reduces wear to the reduced surface 54 of the sleeve adapter 53.

From the foregoing description, it can be readily seen that a simple, facile and efficient automatic clutch engaging and disengaging mechanism which is inexpensive to manufacture has been described. The device eliminates prolonged clutch teeth clashing and prevents damage to the clutch teeth. It also protects the starting motor by preventing rotation of the driving shaft. The device is operative at virtually any speed and need not be tuned or adjusted to start particular motors. It will be operative so long as engine idle speed is higher than zero revolutions per minute. Further at overspeed condition, there will be a continuously-applied frictional force holding the driving clutch in the disengaged position. When the mesh enforcing spring is incorporated into the starter clutch device, the device is fully automatic and self-contained as to engagement, disengagement, indexing and overrunning. The plurality of springs tangs is to ensure long-life for the device, but it will obviously be operative with only a single spring or other frictional connection between driving clutch and driven shaft.

The present invention is not limited to the details of construction and arrangement of parts shown in the drawing or described in the specification. The invention is capable of various other embodiments and of being practiced in various other ways without departing from the scope or spirit thereof.

I claim:

1. A starter drive device comprising:
a drive shaft having a first axially-extending spline formed thereon;
a driving case member having a second axially-extending spline mutually engaging said first spline, said driving case having a cylindrical collar with a first helical spline formed on its inner surface;
a cylindrical driving member having a second helical spline formed on its outer surface operatively engaging said first helical spline and said member having first clutch teeth formed on one end thereof;
a driven member having second clutch teeth formed on one end thereof;
driven shaft means concentrically disposed within said driven member and splined thereto to permit axially-slidable movement of said driven member;
a driven case slidably connected to said driven shaft means;
said driving member having axially-extending slots formed in the inner diametrical surface thereof;
said driven shaft means extending within said driving member, said driven shaft means having a reduced diameter radially inward of said axially-extending slots;
a plurality of spring retarder rings operative to frictionally engage said reduced diameter extension of said driven shaft means, each of said plurality of springs having a tang extending radially outwardly, said retarder spring tangs engaging said slots in said driving member to thereby frictional resist rotation of said driving member; and
an annular mesh enforcing spring mounted co-axially with said driven shaft means between the said driven case and the said driven member, said mesh enforcing spring being extensible along the axis of the said driven member and driven case to provide limited axial movement in the event of tooth abutment, thereby causing tooth engagement.

2. A starter drive device comprising:
a drive shaft having a first axially-extending spline formed thereon;
a driving case member having a second axially-extending spline mutually engaging said first spline, said driving case having a cylindrical collar with a first helical spline formed on its inner surface;
a cylindrical driving member having a second helical spline formed on its outer surface operatively engaging said first helical spline and said member having first clutch teeth formed on one end thereof;
a driven member having second clutch teeth formed on one end thereof;
driven shaft means concentrically disposed within said driven member and splined thereto to permit axially-slidable movement of said driven member; said driven shaft means rotative with said driven member;
said driving member having axially-extending slots formed in the inner diametrical surface thereof;
said driven shaft means extending within said driving member, said driven shaft means having a reduced diameter radially inward of said axially-extending slots; and
a plurality of spring retarder rings operative to frictionally engage said reduced diameter extension of said driven shaft means, each of said plurality of springs having a tang extending radially outwardly, said retarder spring tangs engaging said slots in said driving member to thereby frictionally resist rotation of said driving member.

3. A device as set forth in claim 1 including further:
abutment means for limiting the axial movement of said driven member, thereby eliminating transfer of axial thrust therefrom to said driving member.

4. A starter drive device comprising:
a drive shaft having a first axially-extending spline formed thereon;
a driving case member having a second axially-extending spline mutually engaging said first spline, said driving case having a cylindrical collar with a first helical spline formed on its inner surface;
a cylindrical driving member having a second helical spline formed on its outer surface operatively engaging said first helical spline and said member having first clutch teeth formed on one end thereof;
a driven clutch member having second clutch teeth formed on one end thereof;
driven shaft means concentrically disposed within said driven member and splined thereto to permit axially-slidable movement of said driven member, said driven shaft means rotative with said driven member;
said driving member having axially-extending slots formed in the inner diametrical surface thereof;
said driven shaft means extending within said driving member, said driven shaft means having a reduced diameter radially inward of said axially-extending slots; and
a spring member frictionally engaging said reduced diameter of said driven shaft means, said spring member having radially-outwardly-extending means for engaging said axial extending slots to thereby frictionally resist rotation of said driving member.

5. A device as set forth in claim 4 including further:
abutment means for limiting the axial movement of said driving member.

6. A starter driver device comprising:
power driving means;
a driving member rotatably connected to said power driving means, said driving member slidable relative to said power driving means;
said driving member having first clutch teeth formed on one end thereof;
a driven member having second clutch teeth formed on one end thereof;
driven shaft means concentrically disposed within said driven member;
said driving member having axially-extending slots formed on the inner diametrical surface thereof;
said driven member connected to said driven shaft means;
said driven shaft means extending within said driving clutch member, said driven shaft means having a reduced diameter radially inward of said driving member slots; and
a spring member frictionally engaging said reduced diameter of said driven shaft means, said spring member having radially-outwardly-extending means for engaging said axially-extending slots to thereby frictionally resist rotation of said driving member.

7. A starter drive device comprising:
power driving means;
a driving member rotatably connected to said power driving means, said driving member slidable relative to said power driving means;
said driving member having first clutch means formed thereon;
a driven member having second clutch means formed on one end thereof;
driven shaft means concentrically disposed within said driven member;
said driving member having axially-extending slots formed on the inner diametrical surface thereof;
said driven member connected to said driven shaft means;
said driven shaft means extending within said driving member, said driven shaft means having a reduced diameter radially inward of said driving member slots; and
a spring member frictionally engaging said reduced diameter of said driven shaft means, said spring member having radially-outwardly-extending means for engaging said axially-extending slots to thereby frictionally resist rotation of said driving member.

8. A starter drive device comprising:
power driving means;
a driving member rotatably connected to said power driving means, said driving member slidable relative to said power driving means;
said driving member having first clutch means formed thereon;
driven shaft means having second clutch means connected thereto, said driving member having first connecting means formed thereon;
a spring member frictionally engaging said driven shaft; and
said spring member having second connecting means formed thereon, engaging said first connecting means to thereby frictionally resist rotation of said driving member, said spring member frictionally resisting the rotation of said driving member to a greater degree when said driving member has a rotational velocity exceeding said driven shaft means than when said driving member has a rotational velocity less than said driven means.

9. A device as set forth in claim 8 including further:
means for limiting the axial thrust of said driving member upon said driven member.

10. A starter drive device comprising:
power driving means;
a driving member rotatably connected to said power driving means, said driving member slidable relative to said power driving means;
said driving member having first clutch means formed thereon;
driven shaft means having second clutch means connected thereto; and
a frictional retarder means interconnected between said driven shaft means and said driving member, causing the axial translation of the driving member relative to the driven member by resisting the rotation of the driving member, said frictional retarder means providing a relatively greater force when the driving member is translated toward the driven member than when the driving member is translated away from the driven member.

11. A starter drive device comprising:
power driving means;
a driving member connected to said power driving means, said driving member rotating in response to said power driving means;
driven shaft means for engaging said driving member;
said driving member having means formed thereon permitting it to move axially relative to said power driving means, said driving member movable into engagement with and disengagement from said driven shaft means; and
a frictional retarder means for causing the axial translation of the driving member relative to the driven shaft means by resisting the rotation of the driving member, said frictional retarding means providing a greater retarding force in one direction of axial translation of the driving member than in the other.

References Cited by the Examiner
UNITED STATES PATENTS

| | | | |
|---|---|---|---|
| 1,574,173 | 2/1926 | Schall | 102—6 |
| 2,281,099 | 4/1942 | Kurzina | 192—6 |
| 2,888,114 | 5/1959 | Bostock | 192—49 X |

DAVID J. WILLIAMOWSKY, *Primary Examiner.*

A. T. McKEON, *Assistant Examiner.*